United States Patent [19]
Karlyn

[11] 3,790,371
[45] Feb. 5, 1974

[54] CORROSION-RESISTANT ALLOY

[75] Inventor: David A. Karlyn, Peabody, Mass.

[73] Assignee: USM Corporation, Boston, Mass.

[22] Filed: Dec. 16, 1971

[21] Appl. No.: 208,884

[52] U.S. Cl.................................. 75/170, 249/135
[51] Int. Cl............................................. C22c 19/00
[58] Field of Search....................................... 75/170

[56] References Cited
UNITED STATES PATENTS

| | | | |
|---|---|---|---|
| 1,974,060 | 9/1934 | Cooper | 75/170 |
| 1,685,570 | 9/1928 | Masing et al. | 75/170 X |
| 3,437,480 | 4/1969 | Cape | 75/170 |

*Primary Examiner*—George T. Ozaki
*Attorney, Agent, or Firm*—Richard B. Megley et al.

[57] ABSTRACT

Corrosion-resisting alloy useful for molding surface formed of the alloy for molding of resin, the alloy including nickel, copper and beryllium in certain ranges of proportions.

2 Claims, No Drawings

CORROSION-RESISTANT ALLOY

BACKGROUND OF THE INVENTION

This invention relates to an alloy resistant to corrosion particularly under conditions encountered in molding expanded resin.

The manufacture of articles of plastic by filling a mold with a fluid mass of plastic and solidifying it is an increasingly important process for making a variety of useful or ornamental articles including furniture components, cabinets, cases and other articles. A major element of the cost of molding plastic articles is the provision of suitable molds. The mold surface determines the shape surface character and finish of the molded article so that mechanical shaping of a molding surface requires the work of skilled craftsmen and is very costly. Molds have been formed by casting molten metal around a master and a beryllium copper alloy has been found outstanding in its ability to reproduce fine surface detail such, for example, wood grains.

While such cast molds have been found useful in various relations, it has been found that severe corrosion problems develop in the use of such molds for expanded plastic articles.

It is an object of the present invention to provide an alloy resistant to corrosion in the molding of expanded plastic articles.

SUMMARY OF THE INVENTION

To these ends and according to a feature of the present invention, I have provided a ternary alloy of nickel, copper and beryllium in crtain ranges of proportions useful for forming a corrosion resisting molding surface.

PREFERRED EMBODIMENT

I have found a series of alloys of nickel, copper and beryllium, which are highly resistant to corrosive agents generated at surfaces of molds for plastics and which possess outstanding ability to reproduce fine surface detail of a master against which molten alloy is cast. Molds formed of the alloy also possess hardness, machineability and other physical properties providing outstanding performance in use. The special combination of properties is secured in ternary alloys comprising, based on 100 parts by weight of alloy from about 50 to about 80 parts by weight of nickel, from about 50 to about 20 parts by weight of copper and from about one to about three parts by weight of beryllium.

Preferred ternary alloys will come in the range of from about 55 to about 65 parts by weight of nickel, from about 35 to about 45 parts by weight of copper and from about 1.5 to about 2.5 parts by weight of beryllium with a hardness of about 20 or higher on the Rockwell "C" Scale.

The alloys of this invention may be made conveniently be melting together an alloy of copper and beryllium with either nickel or an alloy of nickel and beryllium in proportions to give the above ternary alloys in the ranges of composition set forth above. Conventional melting and mixing procedures have been found satisfactory for preparing these alloys.

Manufacture of molds by casting may involve preparing a model of the article to be molded or using a prototype of the desired article as a model, and casting a commercially available self-curing rubber-type molding material, such as a silicone rubber, around the model and curing it. The cured rubber molding material is stripped from the model and used for casting a refractory molding material which will form at least a part of a mold for casting the alloy. Suitable materials for forming a refractory mold are compositions comprising a dispersion of a suitable refractory powder in solution of a binder such as ethyl silicate in a volatile solvent such as alcohol. Suitable materials and procedures for the refractory mold forming are those described, for example, in the U.S. Pat. to Shaw No. 2,795,022 entitled "Method of Making Molds," which issued June 11, 1957.

After the refractory molding material has been formed into the rubber mold, it is caused to set, the mold is stripped away and the refractory material is then baked, preferably after a primary firing step to give a surface porosity to form a smooth porous mold for casting the molten alloy.

Casting of the alloy involves melting it by heat, preferably in an induction furnace from a temperature which may be about 2,400° to 2,600° F. and pouring the molten material into the refractory mold where it solidifies. The refractory mold is then removed from the casting and the casting may be air-cooled or quenched in oil at room temperature. The alloy casting in this condition reproduces accurately the fine detail of the refractory mold surface and has strength and hardnes fitting it for use as a mold part for molding plastics. The casting may be subjected to further heat treatments if desired but such further treatment is not necessary. Molds cast of the alloy are readily machined and drilled for cooperation with other mold parts and with plastic injection molding machines.

The mold may be used with injection molding apparatus and processes in general, but is particularly useful for the molding of foamed thermoplastic articles because of its resistance to ammonia or other nitrogenous gases generated by chemical foaming agents such as azo dicarbonamide and p-toluene sulfonyl semicarbazide and other blowing agents used in such processes. Molding processes involve forming a heated mass of thermoplastic material which, in the case of foamed plastic molding will also include a blowing agent, in an injection molding machine, for example, a reciprocally movable screw-type injection molding machine, and operating the machine to force the mixture into the mold where the blowing agent, if such is employed, releases gas to expand the thermoplastic material to fill the mold. After expansion of the thermoplastic material, the thermoplastic material is hardened by cooling, and thereafter removed from the mold. Molds formed of the new alloys have been found to provide good hardness, strength and thermal conductivity properties and withstand extended use in the making of molded articles including thermoplastic foamed articles without objectionable corrosion or wear.

The following example is given to aid in understading the invention and it is to be understood that the invention is not restricted to the particular materials, procedures or conditions employed in the example.

EXAMPLE I 60 parts by weight of nickel and 40 parts of an alloy of copper containing about 4 percent of beryllium were melted by induction heating and maintained at a temperature of about 2,400° F. for 5 minutes.

The molten alloy thus prepared was poured into a refractory mold formed by the steps of casting a cured silicone rubber form around a bed splat and casting refractory material in the cured silicone rubber form, drying and baking the refractory. When the molten alloy had solidified, the refractory mold was broken away and the resulting cast alloy was cooled in air.

The sprue was removed and edge surfaces of the casting material were machined for mating cooperation with a closure member for forming a mold for molding of plastic bed splats. After machining of the mating surface, appropriate mounting and cooling channels were formed in the mold. No difficulty in machining or drilling was encountered.

The mold was brought to a temperature of about 40° F., positioned in operative relation to an injection molding machine and the molding machine was operated to injection mold an impart polystyrene molding composition.

The injection molding composition was an impact polystyrene having a specific gravity of 1.05 and a melting point as determined by the Vicat Test (ASTM — D–569) of about 220° F., the polystyrene being in pellet form and being dusted with about 0.5 percent by weight based on the weight of the polystyrene of azo dicarbonamide blowing agent. The pellets were supplied to a reciprocally movable screw-type injection molding machine with its barrel temperature set at 370° F., and with a pressure of 980 psi. At this temperature and pressure the polystyrene was reduced to molten condition without significant foaming and was injected into the mold where it expanded to fill a mold cavity at 40° F. in an injection time of 5 seconds. The molded polystyrene was removed from the mold after about 90 seconds.

The injection molding machine was operated in production of more than 5,000 plastic molded bed splats and no corrosion of the molding surface was observed. The surface of the molded articles was a substantially exact replica of the surface of the mold splat used as the model with excellent reproduction of fine detail including detail at the joints of the components making up the model bed splat.

EXAMPLE II

A series of alloys was prepared having the following compositions, the percentages being percent by weight:

|  | % Nickel | % Copper | % Beryllium | Pouring Temp. |
|---|---|---|---|---|
| Alloy A | 60% Ni | 40% Cu |  | 2500°F. |
| Alloy B | 80% Ni | 20% Cu | 1% Be | 2500°F. |
| Alloy C | 50% Ni | 50% Cu | 1% Be | 2500°F. |
| Alloy D | 60% Ni | 40% Cu | 2% Be | 2500°F. |
| Alloy E |  | 98% Cu | 2% Be | 1900°F. |

The above alloys were subjected to a spiral fluidity test comparable to the tests described on Page 200 in connection with FIG. 3 of the American Society for Metals Handbook, 1948 Edition, published by the American Society for Metals, Metals Park, Ohio. The test involved pouring the molten material into a ceramic mold, providing a spiral channel of roughly semi-circular section one-quarter inch across the base and three-sixteenths inch from the base to the top of the curve. The total spiral length of the channel was 55 inches and the spiral was contained in an area about 12 inches ×12 inches.

Alloy A progressed only 2 inches along the spiral channel while Alloys B, C, and D traveled 7 inches, 12 inches and 20 inches around the channel. Alloy E, which is the well-known Cu - 2 Be, traveled 25 inches.

These alloys were cast against a ceramic mold surface with a wood graining impression. On examining the "as cast" surfaces, the surface detail reproduction of Alloy D was found commercially acceptable as the equivalent of the surface detail reproduction of Cu - 2 Be (Alloy E). The surfaces detail reproduction in the "as cast" condition of Alloy B and Alloy C were acceptable for many molding operations. The "as cast" surface of Alloy A was not acceptable.

EXAMPLE III

Fine turnings were prepared from Alloys A through E of Example II and these turnings were subjected to an accelerated corrosion test as outlined below.

Weighed amounts of the turnings were placed in a beaker along with concentrated ammonia solution (29 percent by weight ammonia) containing 0.3 percent hydrogen peroxide. The beakers containing the turnings and solution were kept for 5 days in a closed chamber in which an ammonia atmosphere was maintained. Thereafter, the beakers were removed, the turnings were washed with distilled water, rinsed with ethyl alcohol and dried for 30 minutes at 65° C. The dried turnings were then weighed and the loss of weight determined.

It was found that the loss of weight in Alloys A, B, C and D was negligible, in all cases being less than 0.2 percent. On the other hand, Alloy E, the known Alloy Cu - 2 Be, has lost over 15 percent of its weight or 75 times the weight lost by the other alloys. This test, while qualitative only, has been found to coincide with the rate of corrosion of the alloy in use in molds for the molding of expanded plastic material involving the use of blowing agents such as azo (bis) dicarbonamide and other blowing agents which evolve ammonia or other nitrogenous gases.

Having thus described my invention what I claim as new and desire to secure by Letters Patent of the United States is:

1. A ternary alloy resistant to surface corrosion by gases given off by nitrogenous blowing agents comprising based on 100 parts by weight, from 50 to 80 parts by weight of nickel, from 50 to 20 parts by weight of copper and from 1 to 3 parts by weight of beryllium.

2. A ternary alloy as defined in claim 1 comprising from 55 to 65 parts by weight of nickel, from 35 to 45 parts by weight of copper and from 1.5 to 2.5 parts by weight of beryllium.

* * * * *